US012615478B2

(12) United States Patent
Zhou

(10) Patent No.: US 12,615,478 B2
(45) Date of Patent: Apr. 28, 2026

(54) MULTI-CONE SPEAKER

(71) Applicant: SUZHOU SONAVOX ELECTRONICS CO., LTD., Suzhou (CN)

(72) Inventor: Jianming Zhou, Suzhou (CN)

(73) Assignee: Suzhou Sonavox Electronics Co., Ltd., Suzhou (CN)

(*) Notice: Subject to any disclaimer, the term of this patent is extended or adjusted under 35 U.S.C. 154(b) by 394 days.

(21) Appl. No.: 18/043,856

(22) PCT Filed: Oct. 8, 2021

(86) PCT No.: PCT/CN2021/122622
§ 371 (c)(1),
(2) Date: Jun. 20, 2023

(87) PCT Pub. No.: WO2022/048690
PCT Pub. Date: Mar. 10, 2022

(65) Prior Publication Data

US 2023/0336918 A1 Oct. 19, 2023

(30) Foreign Application Priority Data

Sep. 2, 2020 (CN) ......................... 202010908727.5

(51) Int. Cl.
*H04R 7/12* (2006.01)
*H04R 9/02* (2006.01)
(Continued)

(52) U.S. Cl.
CPC ............. *H04R 7/122* (2013.01); *H04R 9/025* (2013.01); *H04R 9/046* (2013.01); *H04R 9/063* (2013.01)

(58) Field of Classification Search
CPC ........ H04R 7/122; H04R 9/025; H04R 9/046; H04R 9/063; H04R 1/26; H04R 5/02;
(Continued)

(56) References Cited

U.S. PATENT DOCUMENTS 5,757,945 A * 5/1998 Sakamoto ................ H04R 9/06 381/400
2007/0116323 A1* 5/2007 Hikichi .................... H04R 9/06 381/396
(Continued)

FOREIGN PATENT DOCUMENTS

CN 103369431 A 10/2013
CN 204465852 U * 7/2015
(Continued)

OTHER PUBLICATIONS

International Search Report and Written Opinion issued for International Patent Application No. PCT/CN2021/122622, dated Jan. 1, 2022 including English translation of ISR in 12 pages.

*Primary Examiner* — Duc Nguyen
*Assistant Examiner* — Chimezie Ezeriwe Bekee
(74) *Attorney, Agent, or Firm* — Knobbe, Martens, Olson & Bear, LLP

(57) ABSTRACT

Disclosed is a multi-cone loudspeaker, including a cone assembly. The cone assembly includes a central cone and a plurality of outer cones successively arranged in a circumferential direction of the central cone. The central cone is driven by a central driving mechanism to vibrate and sound, each of the plurality of outer cones is driven by one of outer driving mechanism to vibrate and sound. The central driving mechanism includes a central voice coil connected to the central cone, and a central magnetic driving system for driving the central voice coil, and each of the plurality of outer driving mechanism includes an outer voice coil connected to one of the plurality of outer cones, an outer damper
(Continued)

sleeved on the outer voice coil, and an outer magnetic driving system for driving the outer voice coil.

14 Claims, 4 Drawing Sheets

(51) Int. Cl.
*H04R 9/04* (2006.01)
*H04R 9/06* (2006.01)

(58) Field of Classification Search
CPC . H04R 7/04; H04R 7/127; H04R 9/06; H04R 2307/021; H04R 2307/025; H04R 2307/027; H04R 2307/029; H04R 2307/204; H04R 9/02; H04R 9/04; H04R 7/06; H04R 1/403; H04R 2400/11; H04R 1/24
USPC ....... 381/150, 335, 396, 412, 420, 423, 430, 381/431, 424; 181/144, 145, 147, 157, 181/164, 165
See application file for complete search history.

(56) References Cited

U.S. PATENT DOCUMENTS

| | | | | |
|---|---|---|---|---|
| 2011/0013798 | A1* | 1/2011 | Niidera | H04R 1/025 381/332 |
| 2016/0080869 | A1 | 3/2016 | Jiang et al. | |
| 2020/0314514 | A1* | 10/2020 | Strunk | H04R 1/025 |

FOREIGN PATENT DOCUMENTS

| | | | | |
|---|---|---|---|---|
| CN | 206533527 | U | * 9/2017 | |
| CN | 107454530 | A | * 12/2017 | H04R 9/06 |
| CN | 110225440 | A | 9/2019 | |
| CN | 112073881 | A | 12/2020 | |

* cited by examiner

MULTI-CONE SPEAKER

This application is the U.S. National Phase under 35. U.S.C. § 371 of International Application PCT/CN2021/122622, filed Oct. 8, 2021, which claims the priority to Chinese Patent Application No. CN202010908727.5, filed Sep. 2, 2020. The disclosures of the above-described applications are hereby incorporated by reference in their entirety.

FIELD OF TECHNOLOGY

The present disclosure belongs to the field of loudspeaker, and relates to a multi-cone loudspeaker, and in particular to a multi-cone loudspeaker that can input multi-channel audio input signals.

BACKGROUND

The cone adopted by the existing traditional loudspeakers is generally disc-shaped, and is connected to a voice coil to form a loudspeaker vibration system. This type of loudspeaker can only be applied to single-channel signal input, however, single-channel audio signal input has limitations for sound reproduction, and when a single voice coil is combined with a cone, there is a high requirement for the rigidity of the cone material. Although the voice coil of this type of loudspeaker can also adopt a multi-channel signal inputting voice coil, such voice coil is formed by multiple sets of coils stacked from inside to outside, the disc-shaped cone and the damper are respectively glued to an outer wall of the voice coil to form a vibration system of the loudspeaker, and this type of loudspeaker can be applied to multiple signal inputs. However, due to the fact that such loudspeaker has one voice wounded by multiple groups of coils, and the multiple groups of coils wound into one voice coil increases the weight of the voice coil, the sensitivity of the loudspeaker may be affected and may decrease when the voice coil drives the cone. Although it is reported that multiple magnetic driving systems are used to drive multiple voice coils respectively, the sound reproduction clarity of the loudspeaker needs to be improved.

SUMMARY

The present disclosure relates to a multi-cone loudspeaker, which improves the sound reproduction clarity and has high sensitivity.

A multi-cone loudspeaker comprises a frame and a cone assembly arranged on the frame, the cone assembly comprises a central cone and a plurality of outer cones, the plurality of outer cones is successively arranged in a circumferential direction of the central cone, the loudspeaker further comprises a central driving mechanism and a plurality of outer driving mechanisms arranged around a periphery of the central driving mechanism, the central cone is driven by the central driving mechanism to vibrate and sound, each of the plurality of outer cones is driven by one of the plurality of outer driving mechanisms to vibrate and sound, the central driving mechanism comprises a central voice coil connected to the central cone, and a central magnetic driving system for driving the central voice coil, and each of the plurality of outer driving mechanisms comprises an outer voice coil connected to one of the plurality of outer cones, an outer damper sleeved on one of the plurality of outer voice coils, and an outer magnetic driving system for driving the outer voice coil.

In an embodiment, the plurality of outer cones is interconnected to form a ring shape surrounding the central cone, and the central cone and the plurality of outer cones are independently arranged on the frame. More preferably, the shape of each outer cone is generally a fan-shaped ring. Further, the area of each outer cone is generally equal.

In an embodiment, the frame comprises a frame and an inner flange extending upwards from the frame, and the outer edge of the central cone is fixedly connected to the inner flange.

In an embodiment, the frame further comprises an outer part and a plurality of middle flanges respectively extending upwards from the frame, the outer part surrounds the outer periphery of the inner flange, the middle flanges are located between the inner flange and the outer part, an outer edge of each outer cone is fixedly connected to the outer part, an inner edge of each outer cone is fixedly connected to the inner flange, and two side edges of each outer cone are fixedly connected to two adjacent middle flanges.

In an embodiment, the middle flanges radially extend along the frame, and each of the outer cones is substantially in a shape of annular sector.

In an embodiment, the frame further comprises an outer part, an inner flange located inside the outer part, and a plurality of middle flanges connected between the outer part and the inner flange, the outer part surrounds the inner flange, an outer edge of the central cone is fixedly connected to the inner flange, each of the outer cones is substantially in a shape of annular sector, an outer edge of each of the outer cones is fixedly connected to the outer part, an inner edge of each of the outer cones is fixedly connected to the inner flange, and two side edges of each of the outer cones are fixedly connected to two adjacent middle flanges.

In an embodiment, the frame further comprises a plurality of outer positioning flanges corresponding to the plurality of outer dampers, one of the plurality of outer positioning flanges is arranged between every two of the plurality of middle flanges that adjacent to each other, the central magnetic driving system is fixedly arranged on the inner flange, and each of the outer magnetic driving systems is fixedly arranged on one of the plurality of outer positioning flanges.

In an embodiment, each of the outer positioning flanges is fixedly connected to at least one of the outer part, the inner flange and the middle flanges through a connecting rib.

In an embodiment, a central through-hole is formed within the inner flange, a peripheral through-hole is formed within each of the outer positioning flanges, a lower end of the central voice coil is inserted into a magnetic gap of the central magnetic driving system through the central through hole, and a lower end of each of the outer voice coils is inserted into a magnetic gap of one of the outer magnetic driving systems through one of the peripheral through-holes.

In an embodiment, each of the central magnetic driving system and the outer magnetic driving systems comprises a U-yoke having a cavity, and a magnetic steel and a magnetic pole core arranged within the U-yoke, an upper end of the U-yoke is fixedly connected to the inner flange or one of the outer positioning flanges, and a magnetic gap into which the central voice coil or one of the outer voice coils is inserted is formed between the magnetic steel and the magnetic pole core and an inner wall of the U-yoke.

In an embodiment, each outer damper is embedded in one of the outer positioning flanges.

In an embodiment, the central driving mechanism further comprises a central damper sleeved on the central voice coil, and the central damper is embedded in the inner flange.

In an embodiment, the inner flange and the outer part are respectively ring-shaped and concentric.

In an embodiment, the frame is circular as a whole, and the center of the circle is the center of the frame.

In an embodiment, each of the central voice coil and the outer voice coils has a pair of leads, an end portion of each of the leads is connected to an inputting terminal that capable of being electrically connected to a power amplifier, the frame is provided with a female connecting port corresponding to the inputting terminal, and the inputting terminal are arranged in the female connecting port.

In an embodiment, a central portion of the central cone has an upward arched spherical dome or a flat plate-shaped main body, and the outer cones have flat plate-shaped main bodies. When the central cone and the outer cones adopt the flat plate-shaped main bodies respectively, the height of the central cone and the outer cones can be lower than the height of the traditional disc-shaped cone, and the product directivity width is better than that of the loudspeaker with a traditional disc-shaped cone.

In an embodiment, a fixing step is formed on a lower surface of the central cone to connect to the central voice coil; and/or, a plurality of fixing steps are formed on lower surfaces of the outer cones to connect to the outer voice coils.

In an embodiment, the plurality of outer driving mechanisms is arranged around the periphery of the central driving mechanism at equal intervals.

In an embodiment, the outer cones are provided with a plurality of outer dust caps for covering the outer voice coils respectively.

Here, "multi-cone" means that the total number of cones is equal to or more than three, preferably at least four.

The loudspeaker of the present disclosure has an ingenious and reasonable product structure, the central cone is promoted to sound by inputting an audio signal to the central voice coil to vibrate up and down in the central magnetic driving system, and the plurality of outer cones is promoted to sound by inputting multi-channel audio signals respectively to the plurality of outer voice coils to vibrate up and down in the outer magnetic driving systems, the central cone emits a midrange and treble sound, and the outer cones increase and expand the bass performance of the loudspeaker, broadens the frequency bandwidth and directivity of the loudspeaker, and reduces the distortion of the loudspeaker; through the combination of the central voice coil and the plurality of outer voice coils, and through driving the respective cones by the central magnetic driving system and the outer magnetic driving systems, the sensitivity of the loudspeaker is increased; by inputting multi-channel audio signals into the central voice coil and the outer voice coils respectively, the central cone and the outer cones are promoted, which can improve the sound reproduction effect of the loudspeaker. In addition, the respective outer voice coils are independent of each other, and the audio signals input to the respective outer voice coils can be different, therefore, the small loudspeaker is suitable for use as a digital loudspeaker and can be used to construct a digital loudspeaker system.

BRIEF DESCRIPTION

For more clearly explaining the technical solutions in the embodiments of the present disclosure, the accompanying drawings used to describe the embodiments are simply introduced in the following. Apparently, the below described drawings merely show a part of the embodiments of the present disclosure, and those skilled in the art can obtain other drawings according to the accompanying drawings without creative work.

REFERENCE NUMBERS

Figure 1:
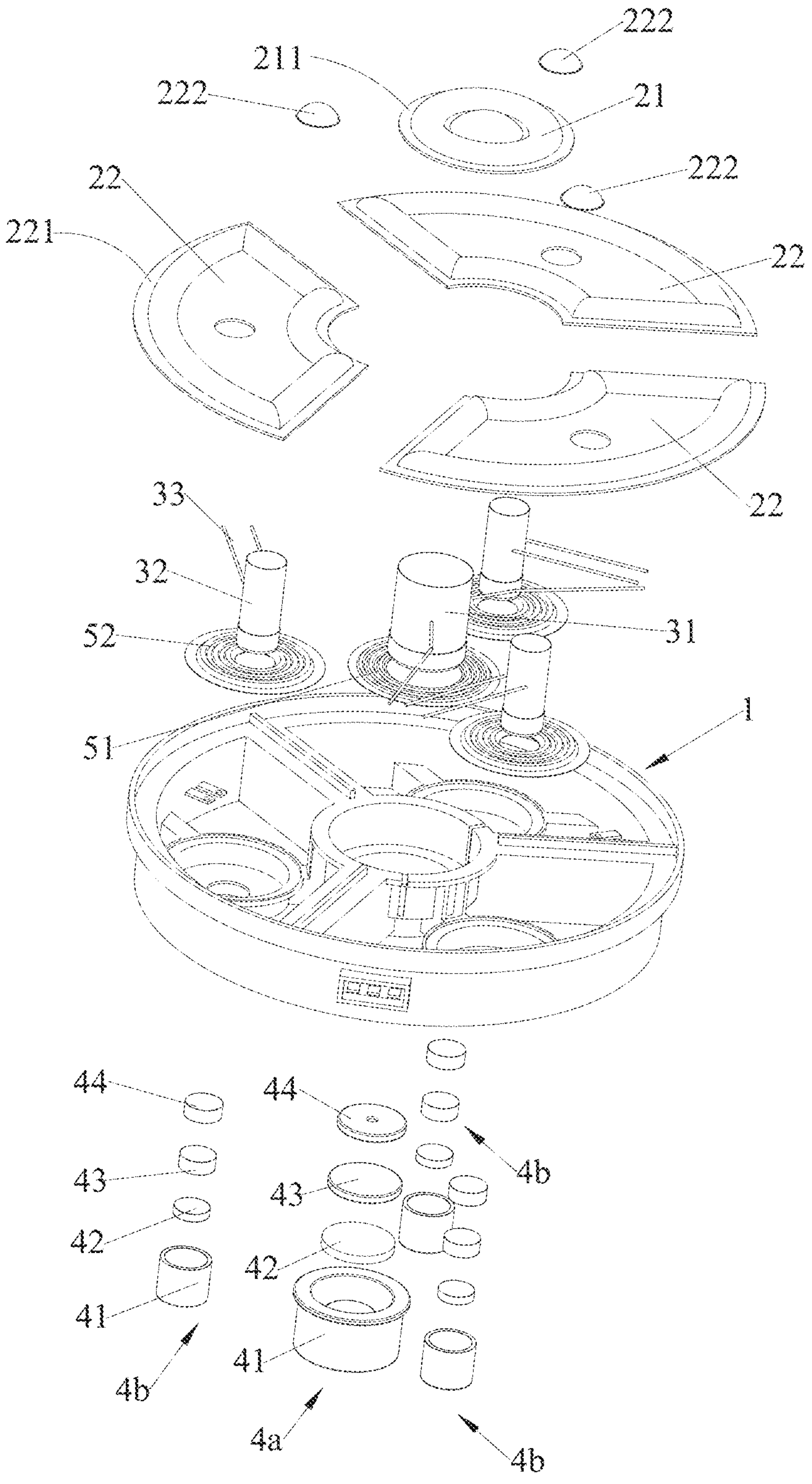
FIG. 1 is a schematic exploded view of a loudspeaker according to an embodiment of the present disclosure.

1—frame; 11—connecting rib; 12—outer part; 121—connecting port; 13—inner flange; 131—central through-hole; 14—middle flange; 15—outer positioning flange; 151—peripheral through-hole;
2. cone assembly; 21—central cone; 211—edge ring; 22—outer cone; 221—edge ring; 222—dust cap;
31—central voice coil; 32—outer voice coil; 33—lead; 34—inputting terminal;
**4*a*—central magnetic driving system; 4*b*—outer magnetic driving system; 41—U-yoke; 42—pad block; 43—magnetic steel; 44**—magnetic pole core;
51—central damper; 52—outer damper.

DETAILED DESCRIPTION OF EXEMPLARY EMBODIMENTS

In the following, the preferable embodiments of the present disclosure are explained in detail combining with the accompanying drawings so that the advantages and features of the present disclosure can be easily understood by the skilled persons in the art. It should be noted that the explanation on these implementations is to help understanding of the present disclosure, and is not intended to limit the present disclosure.

As shown in the specification and the claims, the terms "comprising" and "containing" only indicate that the clearly identified steps and elements are included, and these steps and elements do not constitute an exclusive list, and the method or device may also include other steps or elements. The term "and/or" as used herein includes any combination of one or more of the associated listed items.

In the description of the present application, it should be understood that the orientations or positional relationships indicated by the terms "center", "periphery", "upper", "lower", "left", "right", "vertical", "horizontal", "top", "bottom", "inner" and "outer", etc. are based on those shown in the accompanying drawings, are only for the convenience of describing the present application and simplifying the description, rather than indicating or implying that the indicated device(s) or element(s) must have a specific orientation, be constructed and operated in a specific orientation, and therefore should not be construed as a limitation of the present application.

In the description herein, it should be noted, unless otherwise expressly specified and limited, the terms "mount", "communicate" and "connect" and other terms should be understood in a broad sense, for example, it may be fixedly connected or detachably connected, or integrated; it may be mechanically connected or electrically connected; it can be directly connected or indirectly connected through an intermediate medium, or it can be the internal communication of two elements. For those of ordinary skill in the art, the specific meanings of the above terms in the present disclosure can be understood according to specific situations. On the contrary, when an element is referred to as "directly on" another element, there is no intermediate medium.

This embodiment provides a multi-cone loudspeaker. Here, "multi-cone" means that the total number of cones is equal to or more than three, preferably at least four. Referring to FIG. 1 to FIG. 4, the multi-cone loudspeaker comprises a frame 1 and a cone assembly 2 arranged on the frame 1. The cone assembly 2 comprises a central cone 21 and a plurality of outer cones 22, the plurality of outer cones 22 is successively arranged in the circumferential direction of the central cone 21, and the central cone 21 and the plurality of outer cones 22 are independently arranged on the frame 1 and do not interfere with each other. The loudspeaker further comprises a central driving mechanism for driving the central cone 21 to vibrate and sound and a plurality of outer driving mechanisms for driving the outer cones 22 to vibrate and sound, the outer driving mechanisms are arranged around the periphery of the central driving mechanism, each outer driving mechanism corresponds to one outer cone 22, and the respective outer cones 22 are driven by the corresponding outer driving mechanisms to vibrate and sound. Further, the plurality of outer driving mechanisms is arranged around the periphery of the central driving mechanism at equal intervals. The central driving mechanism comprises a central voice coil 31 connected to the central cone 21, and a central magnetic driving system 4*a* for driving the central voice coil 31, and each outer driving mechanism respectively comprises an outer voice coil 32 connected to the corresponding outer cone 22, and an outer magnetic driving system 4*b* for driving the outer voice coil 32. Preferably, the number of the outer voice coils 32 is three or more, and are arranged in a circle at equal intervals, the center of the circle falls on the midpoint of the central voice coil 31. The central cone 21 is driven by the central voice coil 31 to vibrate and sound, and the central cone 21 undertakes medium and high-frequency sound production. The respective outer cones 22 are driven by the corresponding outer voice coils 32 to vibrate and sound, and the outer cones 22 undertake low and medium-frequency sound production. The plurality of outer voice coils 32 can input multiple different analog or digital audio signals, which improves the sound reproduction performance of the loudspeaker.

When viewing from the top, the central cone 21 has a roughly circular outer contour. The plurality of outer cones 22 is interconnected to form a ring surrounding the central cone 21. Preferably, as shown in FIG. 1, the shape of each outer cone 22 is generally in a shape of annular sector as a whole, and the area of each outer cone 22 is generally equal. In the embodiment as shown in FIG. 1, three outer cones 22 are successively arranged at the periphery of the central cone 21. The central cone 21 is arranged at the center of the frame 1, and the plurality of outer cones 22 is independently arranged on the frame 1. In one embodiment, the central cone 21 and the outer cones 22 respectively have flat plate-shaped main bodies, and reinforcing ribs are arranged on the back (specifically the side surface opposite to the frame 1) of the main bodies of the two to improve the working strength and rigidity, which is used to enhance the strength of the voice coil as it pushes the cone. The height of the central cone 21 and the outer cones 22 is lower than the height of the traditional disc-shaped cone, and at the same time, when the central cone 21 and the outer cones 22 adopt the flat-plate shape, the product directivity width is better than that of the loudspeaker with a traditional disc-shaped cone. In another embodiment, the central portion of the central cone 21 has an upward arched spherical dome, to increase treble frequency extension.

Figure 2:
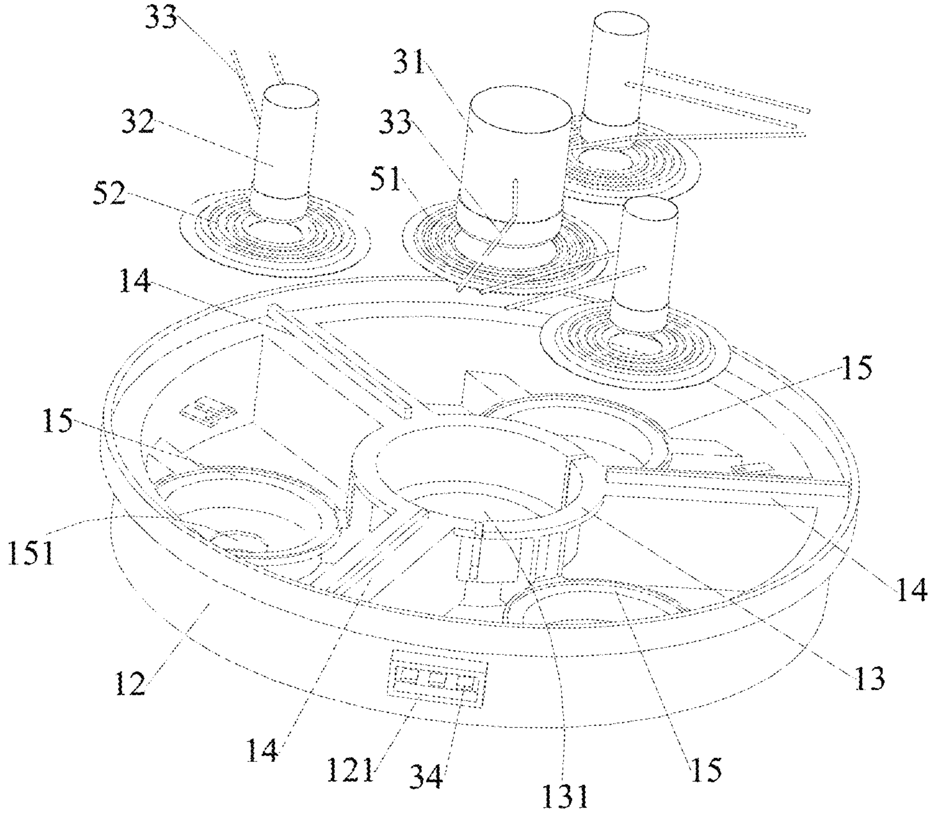
FIG. 2 is a schematic diagram of the frame and the voice coil in FIG. 1.
Figure 3:
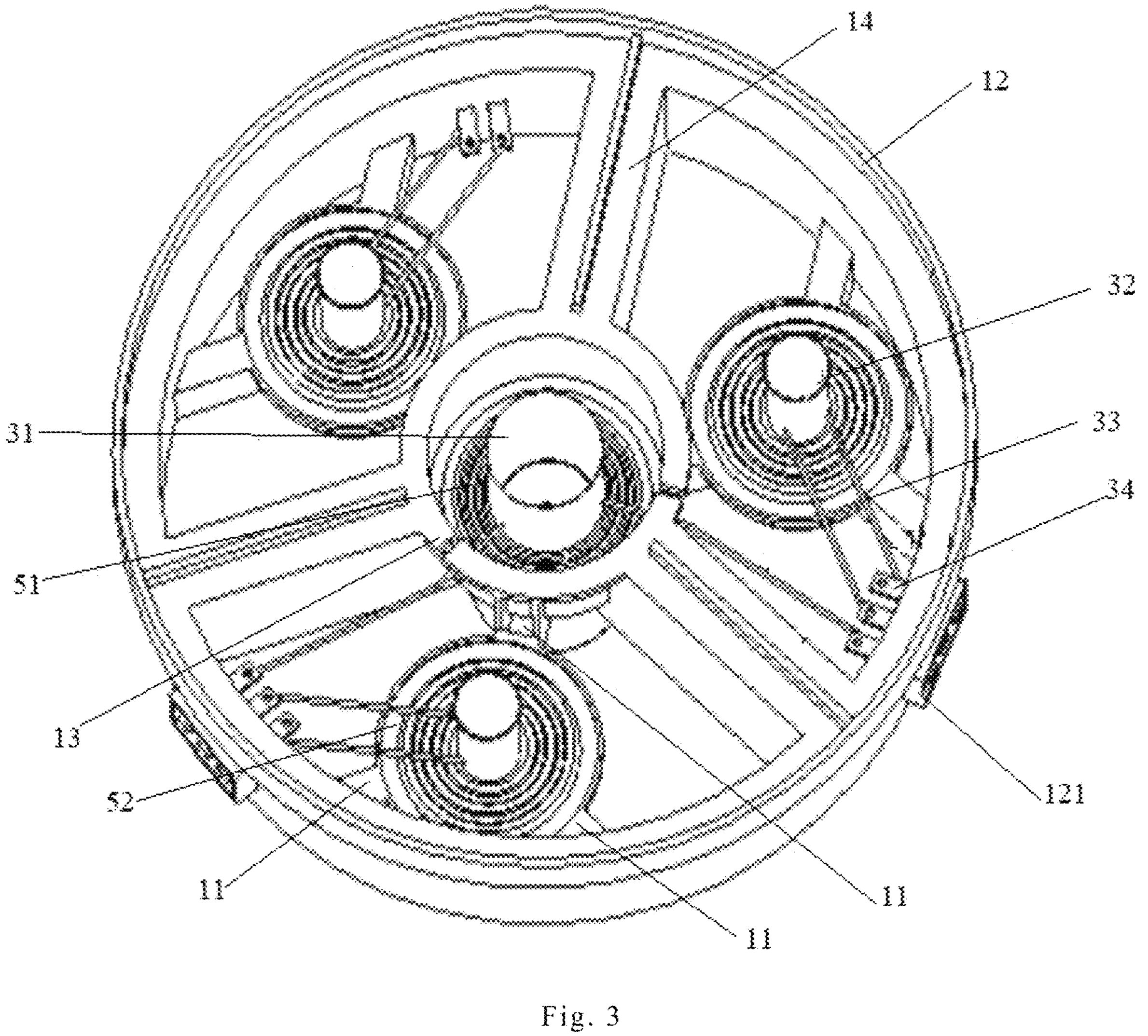
FIG. 3 is a schematic front view of the frame with the voice coil mounted thereon in FIG. 1.

Combining FIG. 2 with FIG. 3, the frame 1 comprises an annular outer part 12, an annular inner flange 13 located inside the outer part 12, and a plurality of middle flanges 14 connected between the outer part 12 and the inner flange 13. The inner flange 13 is in a shape of a ring as a whole, which roughly matches the outer contour of the central cone 21. The outer part 12 surrounds the outer periphery of the inner flange 13, and is also roughly ring-shaped, and the two are roughly concentric rings, i.e., share the same center. The frame 11 is a round flat plate as a whole, the center of the circle is also the center of the frame 11. The middle flanges 14 radially extend along the frame 1, and are located between the inner flange 13 and the outer part 12. The outer edge of the central cone 21 is fixedly connected to the inner flange 13 through an edge ring 211. The inner circumferences of the respective outer cones 22 are fixedly connected to the inner flange 13 through edge rings 221, respectively, and the inner circumferences of the outer cones 22 and the outer edge of the central cone 21 do not overlap, and are not connected to each other. The outer edges of the respective outer cones 22 are connected to the outer part 12 through the edge rings 221, respectively. Two side edges of each outer cone 22 are fixedly connected to two adjacent middle flanges 14 through the edge rings 221, and sides of two adjacent outer cones 22 are not connected to each other, and separated by a ridge on a corresponding middle flange 14. The central magnetic driving system 4*a* and the outer magnetic driving systems 4*b* are fixedly arranged on the frame 11, and the central voice coil 31 and the outer voice coils 32 are located between the cone assembly 2 and the frame 11.

Referring to FIG. 2, the frame 1 further comprises a plurality of outer positioning flanges 15, and one outer positioning flange 15 is arranged between every two adjacent middle flanges 14. The respective outer positioning flanges 15 are fixedly connected to at least one of the outer part 12, the inner flange 13 and the middle flanges 14 through connecting ribs 11. As shown in FIG. 3, the outer positioning flanges 15 are fixedly connected to the outer part 12 and the inner flange 13 through three connecting ribs 11, respectively, and the frame 1 is a hollowed-out structure. The central magnetic driving system 4*a* is fixedly arranged on the inner flange 13, and the respective outer magnetic driving systems 4*b* are fixedly arranged on the corresponding outer positioning flanges 15. Specifically, a central through-hole 131 is formed on the inner flange 13, and a plurality of peripheral through-holes 151 is formed on the respective outer positioning flanges 15. A lower end of the central voice coil 31 is inserted into a magnetic gap of the central magnetic driving system 4*a* through the central through hole 131, and lower ends of the respective outer voice coils 32 are inserted into magnetic gaps of the outer magnetic driving systems 4*b* through the corresponding peripheral through-holes 151.

A central damper 51 is tightly sleeved on the central voice coil 31, the central damper 51 is embedded in the inner flange 13, and the inside surface of the central damper 51 is glued to the central voice coil 31 and the outside surface thereof is tightly fitted with the inner wall of the inner flange 12, preventing the central voice coil 31 and the central cone 21 from swaying except in the vibration direction during vibration. An outer damper 52 is tightly sleeved on each of the outer voice coils 32, the outer dampers 52 are embedded in the corresponding outer positioning flanges 15, and the inside surfaces of the outer dampers 52 are glued to the outer voice coils 32 and the outside surfaces thereof are tightly fitted with the inner walls of the outer positioning flanges 14, preventing the outer voice coils 32 and the outer cones 22 from swaying except in the vibration direction during vibration. The respective outer cones 22 are provided with outer dust caps 222 for covering the outer voice coils 32 respectively. When the above-mentioned central cone 21 is a cone with a spherical dome, it may not be needed to provide the central damper 51.

Referring to FIG. 1, each of the central magnetic driving system 4*a* and the outer magnetic driving systems 4*b* comprises a U-yoke 41 having a cavity, and a pad block 42, a magnetic steel 43 and a magnetic pole core 44 arranged within the U-yoke 41, the pad block 42 is specifically neodymium pad block, and the magnetic steel 43 is a neodymium magnetic steel. An upper end of the U-yoke 41 is fixedly connected to the frame 11, and a magnetic gap into which the central voice coil 31 or the outer voice coils 32 are inserted is formed between the outside surfaces of the three, namely the pad block 42, the magnetic steel 43 and the magnetic pole core 44, and an inner side wall of the U-yoke 41. The above-mentioned central through-hole 131 is opened at the center of the frame 11, an upper end of the U-yoke 41 of the central magnetic driving system 4*a* is fixedly arranged within the central through-hole 131, the U-yoke 41 is mounted with the pad block 42, the magnetic steel 43 and the magnetic pole core 44 from bottom to top therein, the lower surface of the magnetic pole core 44 is tightly fitted with the upper surface of the neodymium magnetic steel 43, the lower surface of the neodymium magnetic steel 43 is tightly fitted with the upper surface of the pad block 42, the lower surface of the pad block 42 is tightly fitted with the upper surface of the bottom of the U-yoke 41, and there is a gap between the outside surfaces of the three, namely the pad block 42, the magnetic steel 43 and the magnetic pole core 44, and the inner side surface of the U-yoke 41, thus forming a magnetic gap into which the central voice coil 31 is inserted. The above-mentioned plurality of peripheral through-holes 151 is distributed evenly around the central through-hole 131, upper ends of the U-yokes 41 of the respective outer magnetic driving systems 4*b* are fixedly arranged within the corresponding peripheral through-holes 151, the U-yokes 41 are mounted with the pad blocks 42, the magnetic steels 43 and the magnetic pole cores 44 from bottom to top therein, the lower surfaces of the magnetic pole cores 44 are tightly fitted with the upper surfaces of the neodymium magnetic steels 43, the lower surfaces of the neodymium magnetic steels 43 are tightly fitted with the upper surfaces of the pad blocks 42, the lower surfaces of the pad blocks 42 are tightly fitted with the upper surfaces of the bottoms of the U-yokes 41, and there is a gap between the outside surfaces of the three, namely the pad blocks 42, the magnetic steels 43 and the magnetic pole cores 44, and the inner side surfaces of the U-yokes 41, thus forming a magnetic gap into which the outer voice coils 32 are inserted. Preferably, the frame 1 is formed by plastic injection molding, and the U-yokes 41 are embedded within the frame 1 during the injection molding process, which improves the combination accuracy. In this embodiment, the above magnetic steel magnetic driving system is also called the internal magnetic system. In addition, a ferrite structure magnetic driving system (i.e., an external magnetic system comprising a T-yoke) or a magnetic steel and ferrite mixed magnetic driving system can also be used.

Figure 4:
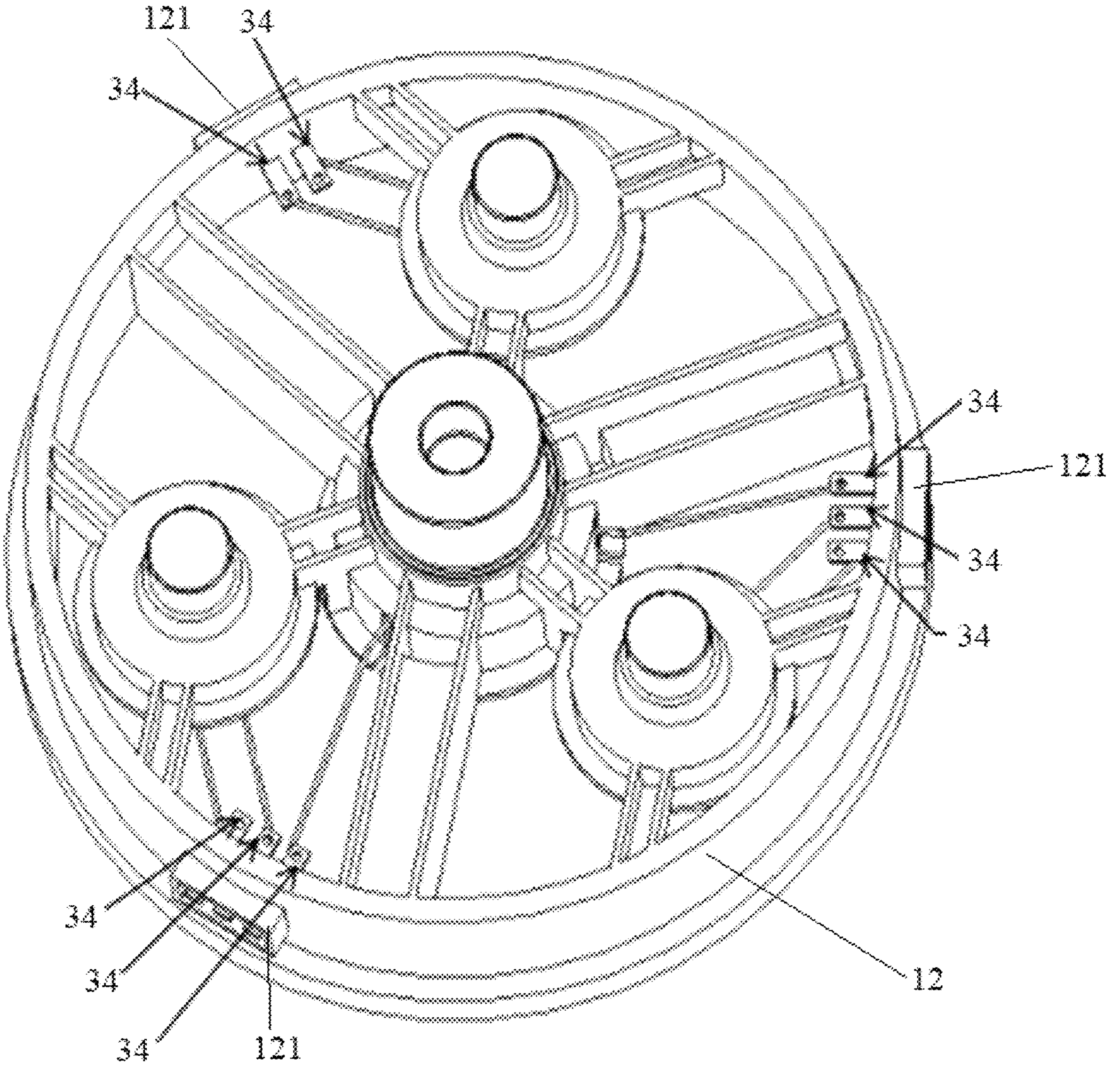
FIG. 4 is a schematic back view of the frame with the voice coil mounted thereon in FIG. 1.

As shown in FIG. 2 to FIG. 4, a plurality of female connecting ports 121 are provided on the outer surface of the outer part 12, a plurality of inputting terminals 34 are integrated within the female connecting ports 121, and can be electrically connected to external components (such as a power amplifier) through the female connecting ports 121. Each of the central voice coil 31 and the respective outer voice coils 32 has a pair of leads 33, an end portion of each lead 33 is connected with one above-mentioned inputting terminal 34 that is embedded on the outer part 12. Specifically, each voice coil is provided with 1 group of positive and negative leads 33, and each group of leads 33 are connected to two inputting terminals 34 on the outer part 12. When it is needed to connect the loudspeaker to a power amplifier, a male connector connected to the power amplifier can be inserted into a female connection port 121, to conduct the inputting terminals 34 therein, and to achieve the transmission of audio signals. By inputting multiple analog audio signals or multiple digital audio signals to the central voice coil 31 and the respective outer voice coils 32 by the plurality of inputting terminals 34, the sound reproduction performance of the loudspeaker is improved.

A fixing step is formed on a lower surface of the central cone 21 to connect to the central voice coil 31, and the upper end of the central voice coil 31 is tightly fitted with the fixing step. Fixing steps are formed on lower surfaces of the respective outer cones 22 to connect to the outer voice coil 32*s*, and the upper ends of the outer voice coils 32 are tightly fitted with the fixing steps.

The material of the above-mentioned frame 1 is plastic or metal material. The central cone 21 and the outer cones 22 are made of different materials, such as plastic (PP), paper, cloth (silks), metal or alloy (aluminum alloy), and can be a film-like material. The edge rings 221 are made of the same material as the outer cones 22, or sponge, rubber, cloth or combinations thereof. They have the advantages of light weight, good damping elasticity and rigidity, high and low temperature resistance, waterproof and mold-proof.

The loudspeaker of this embodiment has the following characteristics: by providing the central cone 21 in the center of the frame 1, providing the step for fixing the voice coil at the lower end of the central cone 21, and fixing the central voice coil 31 on the fixing step of the central cone 21, a vibration system for the midrange and treble sound production is formed; three outer cones 22 with an overall flat shape are provided evenly at the periphery of the central cone 21, the inner side edges and outer side ends of the outer cones 22 are provided with the edge rings, the bottoms of the outer cones 22 are provided with the steps for fixing the voice coils to fix the three outer voice coils on the steps of the corresponding outer cones 22, and to form a vibration system for bass and midrange sound production, thus forming a multi-cone multi-magnetic circuit loudspeaker without a damper. Such a loudspeaker adopts a multi-cone, multi-magnetic circuit and multi-voice coil drive structure, and when compared with the traditional loudspeaker without a damper, a plurality of cones is used, that is, the central cone 21 undertakes the midrange and treble sound production, the plurality of outer cones 22 undertakes the bass and midrange sound production, the combination of multiple cones is conducive to improving the sound reproduction clarity of the loudspeaker, and the bass and directional width of the loudspeaker is also better than that of the loudspeakers with traditional cones; by using a single-channel signal input to drive the central voice coil 31 to move up and down in the magnetic circuit of the U-yoke 41, and by using a multi-channel signal input to drive the plurality of voice coils to move up and down in the magnetic circuits of the plurality of U-yokes 41, the center cone 21 and the flat plate-shaped outer cones 22 are pushed to sound, the sensitivity of the loudspeaker may be increased, and the distortion of the loudspeaker may be reduced. For this loudspeaker, multi-channel audio signal inputs can be used to drive the loudspeaker to sound, and through inputting multi-channel digital audio signals to the loudspeaker, its sound reproduction quality, directivity, frequency width and the like will be better than the traditional loudspeaker. By using the multi-voice coil and flat-cone loudspeaker structure, the height of the loudspeaker is greatly reduced compared with the height of the traditional loudspeaker. It can also change the influence of bass and treble superposition on the performance of the traditional coaxial loudspeakers.

The loudspeaker has an ingenious and reasonable product structure, and the central cone 21 (plane or spherical) is promoted to sound by inputting an audio signal to the central voice coil 31 to vibrate up and down in the central magnetic driving system; the plurality of outer cones 22 is promoted to sound by inputting multi-channel audio signals respectively to the plurality of outer voice coils 32 to vibrate up and down in the outer magnetic driving systems. The central cone 21 adopts a plane shape or a spherical dome at the center to emit midrange and treble sound, and the outer cones 22 of a plane shape increase and expand the bass performance of the loudspeaker, broadens the frequency bandwidth and directivity of the loudspeaker, and reduces the distortion of the loudspeaker; through the combination of the central voice coil 31 and the plurality of outer voice coils 32, and through driving the plurality of cones by the central magnetic driving system 4*a* and the outer magnetic driving systems 4*b*, the sensitivity of the loudspeaker is increased; the central cone 21 adopts a plane or spherical structure, and the outer cones adopt a flat-plate shape and inner and outer edge rings, so that the height of the cones are reduced, thus reducing the height of the product; by inputting multi-channel audio signals into the central voice coil 31 and the outer voice coils respectively, the central cone 21 and the outer cones are promoted, which can improve the sound reproduction effect of the loudspeaker; at the same time, the product has a compact structure, effectively utilizes space, and has a small overall volume that can be used as a small loudspeaker, making assembly and use more convenient.

The embodiments described above are only for illustrating the technical concepts and features of the present disclosure, are preferred embodiments, and are intended to make those skilled in the art being able to understand the present disclosure and thereby implement it, and should not be concluded to limit the protective scope of this disclosure.

What claimed is:

1. A multi-cone loudspeaker comprising:

a frame;

a cone assembly arranged on the frame, comprising a central cone and a plurality of outer cones, the plurality of outer cones being successively arranged in a circumferential direction of the central cone, and the plurality of outer cones being not connected to each other;

a central driving mechanism; and a plurality of outer driving mechanisms arranged around a periphery of the central driving mechanism, wherein the central cone is driven by the central driving mechanism to vibrate and sound, each of the plurality of outer cones is driven by one of the plurality of outer driving mechanisms to vibrate and sound, the central driving mechanism comprises a central voice coil connected to the central cone and a central magnetic driving system for driving the central voice coil, and each of the plurality of outer driving mechanisms comprises an outer voice coil connected to one of the plurality of outer cones, an outer damper sleeved on the outer voice coil, and an outer magnetic driving system for driving the outer voice coil, wherein the frame comprises:

an annular outer part;

an annular inner flange located inside the annular outer part, the annular inner flange being ring-shaped, the central magnetic driving system fixedly arranged on the annular inner flange;

a plurality of middle flanges connected between the annular outer part and the annular inner flange; and a plurality of outer positioning flanges fixedly connected to the annular outer part and the annular inner flange through connecting ribs, the plurality of outer driving mechanisms fixedly arranged on the plurality of outer positioning flanges, wherein each of the central magnetic driving system and the outer magnetic driving systems comprises:

a U-yoke having a cavity; and a magnetic steel and a magnetic pole core arranged within the U-yoke, and wherein an upper end of the U-yoke is fixedly connected to the annular inner flange or one of the plurality of outer positioning flanges, and a magnetic gap into which the central voice coil or one of the outer voice coils is inserted is formed between the magnetic steel and the magnetic pole core and an inner wall of the U-yoke.

2. The loudspeaker according to claim 1, wherein the plurality of outer cones is interconnected to form a ring surrounding the central cone, and the central cone and the plurality of outer cones are independently arranged on the frame.

3. The loudspeaker according to claim 2, wherein an outer edge of the central cone is fixedly connected to the annular inner flange.

4. The loudspeaker according to claim 3, wherein an outer edge of each of the plurality of outer cones is fixedly connected to the annular outer part, an inner edge of each of the plurality of outer cones is fixedly connected to the annular inner flange, and two side edges of each of the plurality of outer cones are fixedly connected to two adjacent middle flanges.

5. The loudspeaker according to claim 4, wherein the plurality of middle flanges radially extend along the frame, and each of the plurality of outer cones is in a shape of annular sector.

6. The loudspeaker according to claim 2, wherein an outer edge of the central cone is fixedly connected to the annular inner flange, each of the plurality of outer cones is in a shape of annular sector, an outer edge of each of the plurality of outer cones is fixedly connected to the annular outer part, an inner edge of each of the plurality of outer cones is fixedly connected to the annular inner flange, and two side edges of each of the plurality of outer cones are fixedly connected to two adjacent middle flanges.

7. The loudspeaker according to claim 1, wherein each outer damper is embedded in one of the plurality of outer positioning flanges.

8. The loudspeaker according to claim 1, wherein each of the plurality of outer positioning flanges is fixedly connected to at least one of the annular outer part, the annular inner flange, or the plurality of middle flanges through a connecting rib.

9. The loudspeaker according to claim 1, wherein a central through-hole is formed within the annular inner flange, a peripheral through-hole is formed within each of the plurality of outer positioning flanges, a lower end of the central voice coil is inserted into a magnetic gap of the central magnetic driving system through the central through-hole, and a lower end of each of the outer voice coils of the plurality of outer driving mechanisms is inserted into a magnetic gap of one of the outer magnetic driving systems through one of the peripheral through-holes of the plurality of outer positioning flanges.

10. The loudspeaker according to claim 1, wherein the central driving mechanism further comprises a central damper sleeved on the central voice coil, and the central damper is embedded in the annular inner flange.

11. The loudspeaker according to claim 1, wherein the annular inner flange and the annular outer part are respectively ring-shaped and concentric.

12. The loudspeaker according to claim 1, wherein each of the central voice coil and the outer voice coils of the plurality of outer driving mechanisms has a pair of leads, an end portion of each of the leads is connected to an inputting terminal that capable of being electrically connected to a power amplifier, the frame is provided with a female connecting port corresponding to the inputting terminal, and the inputting terminal are arranged in the female connecting port.

13. The loudspeaker according to claim 1, wherein a central portion of the central cone has an upward arched spherical dome or a flat plate-shaped main body, and the plurality of outer cones has flat plate-shaped main bodies.

14. The loudspeaker according to claim 1, wherein a fixing step is formed on a lower surface of the central cone to connect to the central voice coil; and/or, a plurality of fixing steps are formed on lower surfaces of the plurality of outer cones to connect to the outer voice coils of the plurality of outer driving mechanisms; and/or, the plurality of outer cones are provided with a plurality of outer dust caps for covering the outer voice coils of the plurality of outer driving mechanisms respectively.

* * * * *